April 11, 1967 H. R. DUTTON ETAL 3,313,536
SHOCK ABSORBER
Filed Feb. 1, 1965 3 Sheets-Sheet 1

INVENTOR.
Harold R. Dutton
BY
J.C. Evans
HIS ATTORNEY

April 11, 1967  H. R. DUTTON ETAL  3,313,536
SHOCK ABSORBER

Filed Feb. 1, 1965  3 Sheets-Sheet 2

INVENTOR.
Harold R. Dutton
BY
J.C. Evans
HIS ATTORNEY

United States Patent Office 3,313,536
Patented Apr. 11, 1967

3,313,536
SHOCK ABSORBER
Harold R. Dutton, Dayton, Ohio, and Mark A. Eilers, Bloomfield Hills, Mich., assignors to General Motors Corporation, Detroit, Mich., a corporation of Delaware
Filed Feb. 1, 1965, Ser. No. 429,248
8 Claims. (Cl. 267—64)

This invention relates to shock absorbers and more particularly to combination shock absorber and air spring units and a method of assembling such units.

In combination shock absorber and air spring units and like units one problem has been that of obtaining an economical, reliable fluid-tight pressure seal between a resiliently compressible sleeve member or like relatively movable portion of a pressurizable chamber forming enclosure of the air spring unit.

An object of the present invention, therefore, is to improve the connection of a resiliently compressible sleeve to a rigid tubular member having an initially uniform outside diameter by slipping the sleeve over a portion of the tubular member and placing a continuous clamping ring on the outside diameter of the flexible sleeve and then uniformly controllably deforming the ring radially inwardly by means of a magnetic field to form a continuous depression in the tube that interlockingly receives a portion of the sleeve while directing the ring into the outer diameter of the sleeve to interlock it between the tube depression and the ring.

A further object of the present invention is to improve combination shock absorber and air spring units by the provision of an economical, reliable, magnetically-formed connection between a resiliently compressible sleeve portion of the air spring unit and rigid tubular members of the shock absorber assembly that are characterized by having an initially uniform outside diameter between the ends thereof.

A further object of the present invention is to improve combination shock absorber and air spring units by forming the fluid-tight connections between the air spring unit and shock absorber assembly by means of a simultaneous operation including forming a resilient member receiving depression in rigid tubular portions of the shock absorber and locating in situ a ring member that maintains the resilient portion of the air spring in the depression for effecting a reliable and leakproof mechanical connection between the flexible portion of the air spring unit of the shock absorber and the tubular portions.

Yet another object of the present invention is the provision of a magnetically formed connecting fitting at either end of a resiliently flexible sleeve portion of a combination shock absorber and air spring unit including an outer clamping ring member simultaneously formed in situ with a circumferential depression in a tubular portion of the shock absorber wherein the depression receives one end of the sleeve and the ring is uniformly radially inwardly deformed to press the end portion of the sleeve into a completely uniform sealing engagement with the depression as well as a continuously circumferentially formed interlocking fit therebetween.

Further objects and advantages of the present invention will be apparent from the following description, reference being had to the accompanying drawings wherein preferred embodiments of the present invention are clearly shown.

Figure 1:
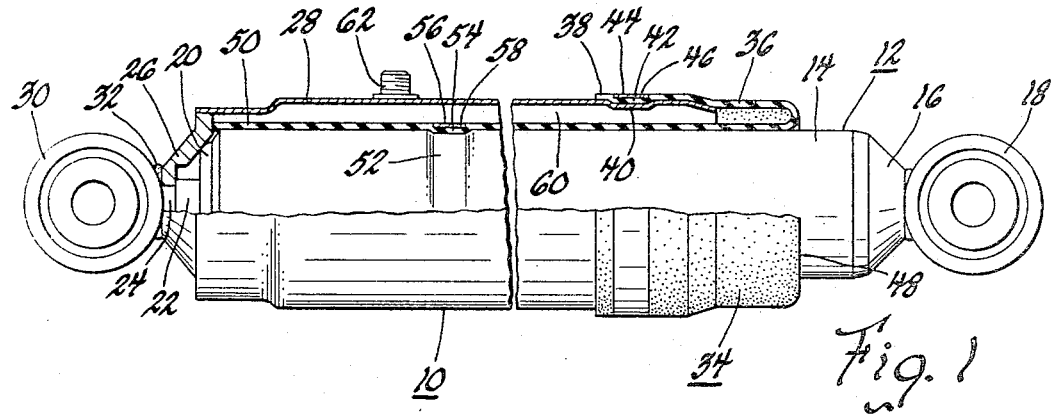
FIGURE 1 is a view partially in elevation and partially in section of an assembly of a combination shock absorber and air spring unit constructed in accordance with certain of the principles of the present invention.

In FIGURE 1 an improved shock absorber and air spring assembly 10 is illustrated including a double-direct-acting shock absorber 12 having an elongated outer tubular portion 14 with a closure member 16 at one end thereof secured to a ring bearing mount member 18 that is adapted to be connected to an unsprung mass of a vehicle such as an automobile axle. The shock absorber unit 12 includes another closure member 20 for closing the opposite end of the tube 14 and the member 20 has a reciprocal piston rod 22 directed exteriorly thereof which has a small diameter portion 24 thereon that receives an end member 26 in a press fit relationship serving as a top end closure for an open-ended outer dust shield or elongated rigid tubular member 28 that is concentrically arranged with respect to the shock asborber unit 12 in spaced surrounding relationship therewith. The piston rod 22 is fixedly secured to a ring bearing mount 30 by suitable means such as welding at 32 and the ring 30 is adapted to be connected to a sprung mass such as the body of an automobile.

The shock absorber 12 is a double, direct-acting, hydraulic type wherein the outer tube 14 serves as a reservoir forming tube. It should be understood that while a double-acting hydraulic shock absorber is illustrated, it is merely representative of one suitable fluid damping arrangement for controlling high frequency movements between the unsprung and sprung masses as produced during normal road movements of the automobile vehicle or the like.

Figure 6:
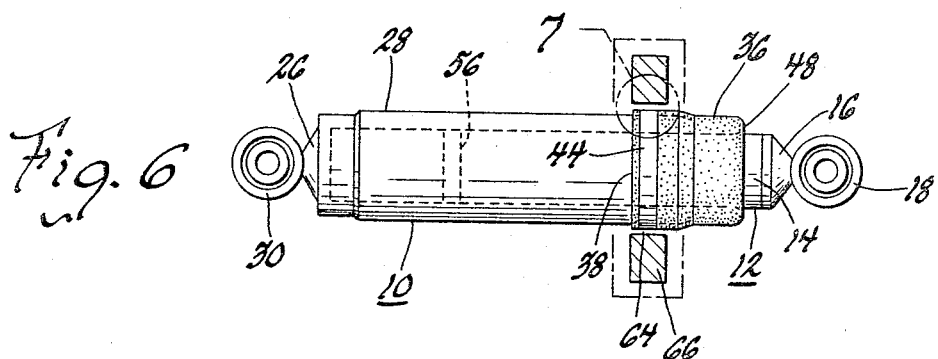
FIGURE 6 is a schematic view showing a step of the manufacturing process wherein the opposite end of the sleeve is fastened to the outer dust shield or rigid tubular member of the assembly.

In the embodiment of the invention illustrated in FIGURE 1, the shock absorber unit 12 is associated with a surrounding air spring unit 34 that is, in part, formed by the dust shield 28 and the inner shock absorber assembly 12. More particularly, the unit 34 includes a resiliently compressible sleeve 36 of rubber, rubber-like plastic or other like material having one end 38 thereof fastened over the outer surface of the tubular member 28 at the lower open end thereof. As best seen in FIGURE 6, the tube 28 has a continuous circumferential depression 40 therein that receives a radially inwardly directed rib 42 that is formed continuously circumferentially about the inner surface of the sleeve 36 adjacent its end 38. The rib 42 is held in an unusually tight sealing relationship within the depression 40 by a continuously formed clamp ring 44 that is substantially uniformly radially inwardly deformed to press into the outer surface of the end 38 to form a continuous circumferential interlocking depression 46 therein whereby, in addition to the good fluid seal across depression 40 and rib 42, an unusually sound mechanical interconnection is obtained between the end 38 of sleeve 36 and the dust shield 28. The outer surface of the ring 44 is at or slightly below the uncompressed adjacent outer surface of the sleeve 36 so that the sleeve 36 serves to prevent snagging of the ring 44 against objects located exteriorly of the combination unit 10.

Figure 4:
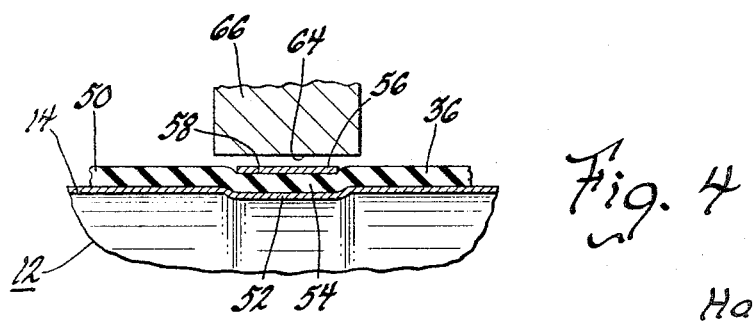
FIGURE 4 is an enlarged, fragmentary, cross-sectional view of the region 4 in FIGURE 3.
Figure 5:
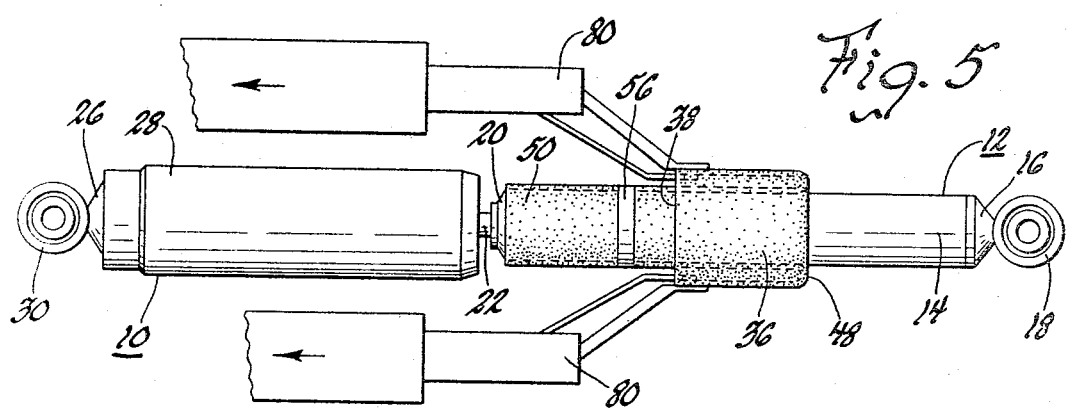
FIGURE 5 is a schematic view of a sleeve turning step in the manufacturing process.

The flexible sleeve 36 is turned inwardly to form a return bend portion 48 that is joined to another end 50 of the sleeve 36 that is fit over the outer surface of tube 14 in supported relationship thereon. In the illustrated arrangement the end 50 is shown as extending completely to the top portion of the tube 14 and when the shock absorber is in a completely collapsed position, as illustrated in FIGURE 1, the end 50 is fastened at any satisfactory functional position down from the top of the tube 14 by a connection best seen in FIGURE 4 as including a continuously circumferentially deformed depression 52 in the surface of tube 14 that receives a continuous circumferential rib 54 on sleeve 36 that is directed radially inwardly of the inner surface of the end 50 to be supportingly received within the depression 52. As in the case of the connection of the sleeve at its opposite end to shield 28, the inwardly located connection also includes a radially inwardly deformed clamp ring 56 that holds the rib 54 in an unusually good fluid sealing contact with depression 52. The ring 56 is forced into the outer surface of the sleeve end 50 to form a depression 58 therein whereby the ring, sleeve and tube 14 are interlockingly connected by an unusually good, sound, mechanical relationship. The clamp ring 56 has its outer surface at or below the adjacent uncompressed surface of end 50 to prevent contact between it and the depressed portion 40 of member 28 during the operation of the unit.

The outer dust shield 28, sleeve 36 and shock absorber 12 thereby coact to form a pressurizable chamber or space 60. In the illustrated arrangement an air fitting 62 is supported by the dust shield or tubular outer member 28 for communicating the chamber 60 with a suitable source of pressure or to an exhaust depending upon whether it is desired to inflate or deflate the combination unit 12. The actual operation of combination units such as unit 10 is well understood by those skilled in the art, but for a complete understanding of the disclosure, reference is made to a like unit disclosed in United States Patent 3,063,702, issued Nov. 13, 1962, to Paul J. Long, Jr., for a Combined Shock Absorber and Air Spring Unit Assembly.

In accordance with certain of the principles of the present invention, the improved shock absorber assembly illustrated in FIGURE 1 is manufactured by an unusually economical and reliable process, as detailedly shown in part in FIGURES 2 through 7.

Figure 2:
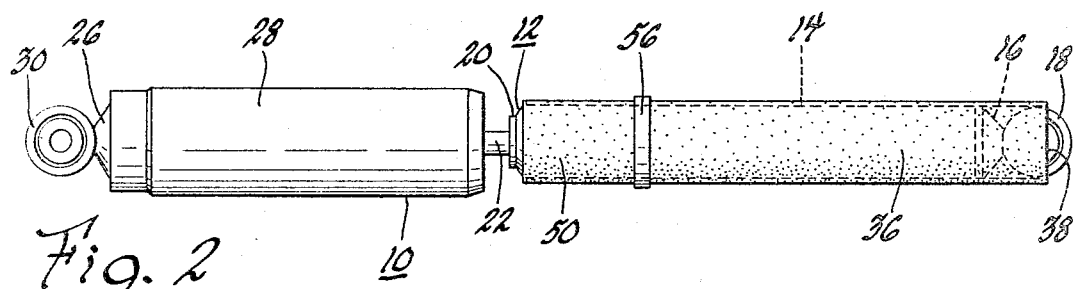
FIGURE 2 is a schematic view of an initial stage in the assembly of the unit in FIGURE 1.
Figure 3:
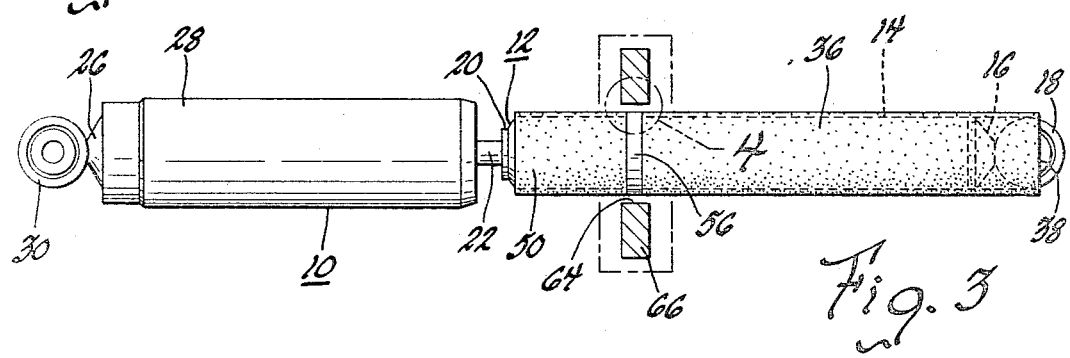
FIGURE 3 is a schematic view of a magnetic forming stage in the manufacture of the shock absorber in FIGURE 1.

Referring now to FIGURE 2, a schematic outline of a unit such as that illustrated in FIGURE 1 is illustrated showing the outline of the outer dust shield 28, the outline of the shock absorber tube portion 14 and the sleeve 36. In FIGURE 2, the shock absorber is shown in its extended position and the sleeve 36 is shown as being slipped over the outer surface of the tube 14 which is initially of a substantially uniform outside diameter between the open ends thereof. In the initial assembly step, the clamp ring 56 is of a slightly greater diameter than the outer diameter of the sleeve 36 and it is slipped into a position thereover to a point adjacent the upper end of the shock absorber unit 12.

Figure 8:
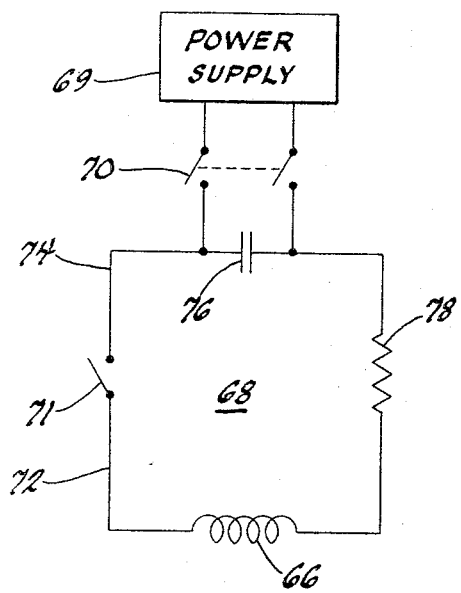
FIGURE 8 is a diagrammatic view of an electrical circuit for practicing the method of the present invention.
Figure 7:
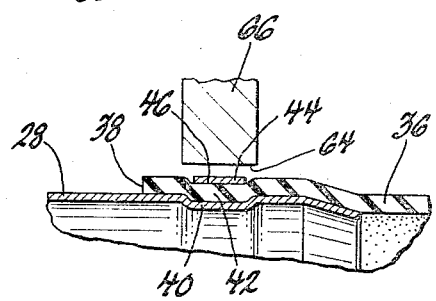
FIGURE 7 is an enlarged, fragmentary, sectional view of the region 7 in FIGURE 6.

In the second step of the manufacturing process the extended shock absorber sleeve and ring are concentrically arranged within an opening 64 within a magnetic coil 66. The coil 66 is part of a magnetic forming circuit 68 such as is illustrated in FIGURE 8 that includes the coil 66 which is energized by closing a switch 71 therein having one terminal thereof connected to a conductor 72 to the coil 66 and the opposite terminal thereof connected to a conductor 74 connected to a capacitor bank 76. The bank 76 is charged from a power supply 69 when a switch 70 is closed. The bank 76, upon closing the switch 71, is discharged through a resistance 78 representing the resistance of the circuit 68 and through the coil 66. In one typical manufacturing process sufficient current is released from the bank 76 to produce a field surrounding the coil 66 of approximately six kilojoules. As is known by those skilled in the magnetic forming art, eddy currents are formed in the ring 56 having a magnetic field thereabout that is opposed to the primary field of the coil 66. Accordingly, substantially instantaneously the ring 56 is uniformly deformed radially inwardly to form the depression 52 that receives the rib 54 in sealing engagement therewith while forcing the ring into the outer surface of the sleeve end 50 to form the interlocking depression 58 therein. Thus, the depression 54, rib 52, deformed ring 56 and depression 58 are simultaneously formed by a magnetic process to produce an unusually good seal and mechanical connection without undesirably tearing or ripping the sleeve end 50 and without subjecting the reservoir forming tube 14 of the shock absorber to any undesirable twisting movements or the like that might misalign the internally located relative reciprocal damping components of the shock absorber 12. Furthermore, by connecting the sleeve end 50 to the outer surface of the shock absorber 12 by a magnetic forming process, the tube 14 can initially have a uniform outer diameter since the magnetic forming process can produce the interlocking depression therein simultaneously with the connection of the ring in place, thus eliminating the need for a separate fabrication step or extra die parts during the manufacture of the reservoir tube 14 of the shock absorber 12.

Following the connection of the sleeve end 50 to the outer surface of the shock absorber 12, the shock absorber unit is retained in its extended position and moved to a sleeve turning station including suitable reciprocal clamp means 80 that grip the end 38 of the sleeve and turn it over the outer surface of end 50 to form the return bend portion 48. The reciprocal gripping means 80 are moved to draw the end 38 over the opened end of the shield 28 which initially has a substantially uniform diameter between inwardly swaged end portions thereon. When the sleeve end 38 is securely fitted over the open end of the shield 28, the combination unit 10 is moved into its collapsed position and the outer clamping ring 44, end 38 and the outer surface of the shield 28 that has the uniform diameter is concentrically arranged within the opening 64 of coil 66 as shown in FIGURE 6. The diameter of coil 66 will be varied to accommodate the greater O.D. of the unit 12 at this stage of fabrication. The switch 71 is closed to again effect a substantially instantaneous uniform radially inwardly directed deformation of the ring 44 to form the good fluid seal and mechanical interconnection between end 38 and sleeve 28 as shown in enlarged detail in FIGURE 7. In one working embodiment, the field in coil 66 to produce this connection was in the range of 5 kilojoules.

By simultaneously forming the flexible sleeve receiving depression 42 and radially inwardly directed ring 44 in situ by a magnetic process, the need for additional die parts or metal forming steps is eliminated in the formation of the dust shield 28. Moreover, the instantaneous application of the magnetic field effects an unusually uniform deformation of the clamping ring 44 that meets the operating demands of the combination unit 10.

Figure 9:
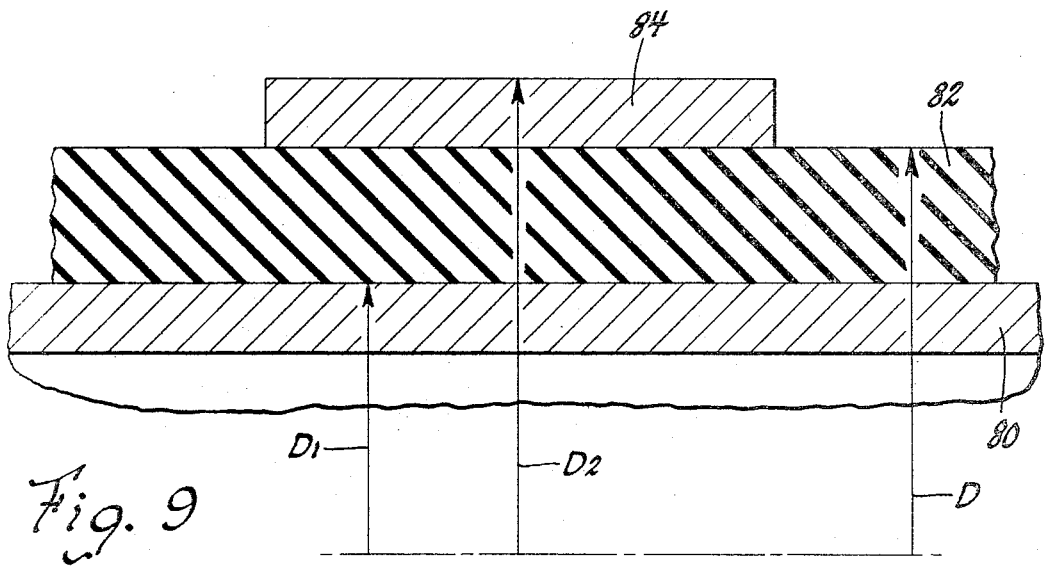
FIGURE 9 is an enlarged, fragmentary, sectional view of flexible and rigid tubular members to be connected by uniformly deforming a continuous clamping ring therearound in accordance with the present invention.
Figure 10:
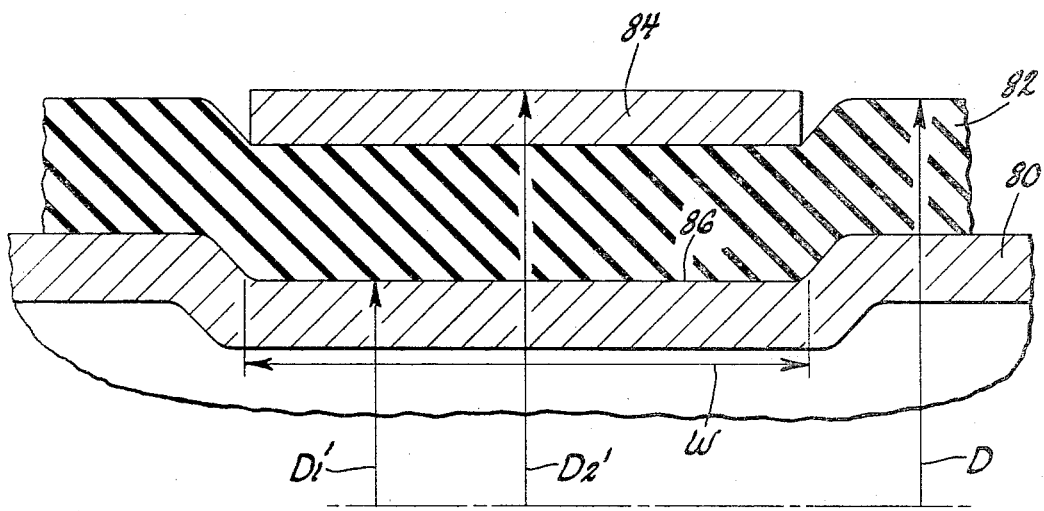
FIGURE 10 is an enlarged, fragmentary, sectional view of the members in FIGURE 9 following interconnection by the present invention.

While the improved assembly method of the present invention is discussed with reference to a combination air spring and shock absorber unit, the method is applicable to connecting any rigid tubular member to a resiliently compressible sleeve by means of a continuous clamping ring. Thus, in FIGURE 9, a fragmentary portion of a rigid tubular member 80 is shown with a fragmentary portion of a sleeve member 82 slipped thereover. The rigid tubular member 80 has an initially uniform outer diameter $D_1$. The sleeve 82, as illustrated, is surrounded by a continuous circular clamping ring 84 having an initial O.D. $D_2$. In practicing the invention, the ring 84 is uniformly deformed around the circumference thereof by applying a magnetic field thereto as discussed in the application in the method to the combination shock absorber and air spring unit 10 above. The application of such a uniform magnetic force continuously about the outer circumference of the ring 84 causes it to deform the tubular member 80 to form a depression 86 therein having a width W and an outer diameter $D_1'$ into which a portion of the flexible sleeve 82 is interlockingly received. The application of the uniform force on the ring 84 also causes it to be pressed substantially completely within the outer surface of the sleeve 82 and to deform the ring 84 to have a uniform O.D. of $D_2'$ which is substantially equal to the O.D. D of sleeve 82. By applying such a uniform magnetic force throughout the circumference of the ring 84, the sleeve 82 is thus uniformly pressed into an interlocking fit with the rigid tubular member 80 without any tendency to be structurally weakened at the connection point whereby the connection between the sleeve 82 and tubular member 80 can serve as a relatively good fluid seal therebetween. Thus, as indicated above in the method aspect of the invention, a product such as a combination air spring and shock absorber unit can be formed to have both reliable mechanical interconnections at the joint between the resilient and rigid members therein as well as a good fluid sealing connection therebetween.

By connecting the resiliently compressible sleeve of the combination unit 10 or like units by a magnetic process, the need for backing dies or the like is eliminated and the connection can be formed quickly in place without having to worry about damaging relatively sensitive fluid control elements of the shock absorber or the like. Furthermore, the method, because of the uniform application of forces applied relatively instantaneously, enables a relatively reasonably priced resilient compressible sleeve material to be used without worrying about excessive tearing or other damage thereto during the manufacturing process.

While the embodiments of the present invention as herein disclosed constitute preferred forms, it is to be understood that other forms might be adopted.

What is claimed is as follows:

1. In a shock absorber and air spring unit, the combination of, an internally located direct-acting hydraulic shock absorber having a cylindrically-shaped, thin walled member forming a fluid reservoir, a tubular thin walled dust shield member concentrically arranged in spaced surrounding relationship with the cylindrically-shaped thin walled member and a resiliently compressible sleeve with one end fastened over an end of said tubular dust shield member and the other end turned inwardly into surrounding engagement with the reservoir forming member, a continuous clamp ring of substantially continuous uniform cross section compressed into the outer surface of one end of said sleeve and forming a sleeve receiving circumferential depression in said tubular dust shield member, said ring, sleeve end and circumferential depression being formed simultaneously in situ by application of a magnetic field on said ring whereby it is forced radially inwardly of the outer surface of the sleeve and the inner surface of the sleeve is forced radially inwardly against said tubular member to form the depression so that the sleeve end is held tightly between said ring and said tubular dust shield member.

2. In the combination of claim 1, said ring having a diameter across the outer surface thereof equal to the outer diameter of a compressed adjacent surface of said sleeve whereby the end edges of said ring are protected by said sleeve from being dislodged from within said sleeve.

3. In a shock absorber and air spring unit, the combination of, an outer thin walled shock absorber reservoir tube having an initially uniform outer diameter intermediate the ends thereof and an open ended thin walled tubular member arranged concentrically of and in spaced surrounding relationship with the shock absorber reservoir tube with an initially uniform outer diameter, a resiliently compressible sleeve having one end thereof fit over an open end of the tubular member and an opposite end thereof turned inwardly and fit over a portion of the initially uniform diameter of the reservoir tube, a continuous ring surrounding the sleeve being uniformly deformed by a magnetic field into the outer surface of said sleeve, said ring forcing a portion of the inner surface of the sleeve radially inwardly and continuously circumferentially depressing the outer surface of said reservoir tube beneath said inner surface sleeve portion whereby said sleeve is held in interlocking engagement between said ring and said tube to form a fluid tight seal therebetween.

4. In a combination shock absorber and air spring unit, the combination of, an inwardly located thin walled reservoir forming tube having an initially uniform outer diameter intermediate the ends thereof, a rigid outer thin walled tube concentrically arranged in spaced relationship with the reservoir tube, a resiliently compressible sleeve member having one end thereof fit over an end of said outer tube and the opposite end thereof turned inwardly and fit over the outer surface of said reservoir tube, means for connecting each end of said sleeve member to the shock absorber and air spring unit including uniformly radially inwardly magnetically deformed rings compressed into the outer surface of the sleeve, said rings having the ends thereon seated beneath an adjacent outer surface portion on said sleeve whereby said sleeve protects said ring against being unseated therefrom, said tubes having continuous circumferential depressions magnetically formed therein, said sleeve having a radially interior surface portion thereon fit into said depressions interlocking said sleeve in place on said tubes.

5. In the combination of claim 4, said rings having the outer surfaces thereof substantially at the level of the uncompressed adjacent surfaces of said sleeves.

6. A method for connecting a resiliently compressible sleeve to a thin walled member by means of a continuous clamping ring comprising the steps of, locating the sleeve over a smooth undeformed portion of the thin walled member, concentrically arranging the clamping ring about the outer surface of the sleeve, applying a continuously uniform magnetic field about the clamping ring to form a retaining seat in the thin walled member, simultaneously locating a portion of the flexible sleeve into the retaining seat uniformly pressing the clamping ring into the outer surface of the sleeve whereby the sleeve is interlockingly held between the ring and thin walled member.

7. A method for connecting a resiliently compressible sleeve to a thin walled member having an initially uniform outer diameter by a continuous clamp ring comprising the steps of, locating the sleeve over the uniform outer surface of the thin walled member, concentrically disposing the clamp ring about the outer surface of the sleeve, applying a magnetic field uniformly about the outer surface of the ring to simultaneously cause it to be located in situ completely within the outer surface of the sleeve while deforming the thin walled member to receive a portion of the sleeve in the outer surface of the thin walled member whereby the flexible sleeve is held in interlocking fit between the thin walled member and the clamping ring.

8. In a method for assembling a combination shock absorber and air spring unit of the type including an elongated inwardly located tube, an outer tubular member concentrically arranged about the inner tube in spaced relationship therewith having a closed end and an open end, and a resiliently compressible sleeve having one end thereof adapted to be fit over the open end of the outer tubular member and another end adapted to be fit over the outer surface of the inwardly located tube, the steps of, connecting the flexible sleeve to the inwardly located tube by concentrically arranging the one end of the sleeve on the outer surface thereof, locating a ring-like clamp member around the one end of the sleeve, locating the concentrically arranged tube, sleeve and end ring member within a magnetic coil, conditioning said coil to produce a predetermined magnetic field for simultaneously uniformly deforming the ring radially inwardly into the outer surface of the sleeve end and continuously deforming the tube circumferentially to receive a portion of the inner surface of the sleeve end in interlocking engagement therewith, drawing the opposite end of the sleeve over the fastened end of the sleeve and fitting it over the open end of the tubular member, arranging a second ring concentrically about the opposite sleeve end on the outer tubular member, locating the concentrically arranged second ring within a magnetic coil means, conditioning the magnetic coil means to produce a second predetermined magnetic field for simultaneously deforming the second ring radially inwardly into the outer surface of the opposite end of the sleeve and deforming the outer surface of the outer tubular member uniformly and continuously circumferentially thereabout for receiving a radially inwardly directed portion of the inner surface of the opposite end of the sleeve into interlocking and sealing engagement therewith whereby said outer tubular member, inner reservoir forming tube and sleeve form a pressurizable chamber of the air spring portion of the combination unit.

References Cited by the Examiner
UNITED STATES PATENTS

| | | | |
|---|---|---|---|
| 2,570,421 | 11/1951 | Baldwin et al. | 29—517 |
| 3,063,701 | 11/1962 | Long | 267—64 |
| 3,176,388 | 4/1965 | Dutton | 29—450 |
| 3,214,511 | 11/1965 | Franklin. | |

ARTHUR L. LA POINT, *Primary Examiner.*

R. W. WOHLFARTH, *Assistant Examiner.*